United States Patent
Lee et al.

(10) Patent No.: US 10,914,063 B2
(45) Date of Patent: Feb. 9, 2021

(54) WATERPROOFING SYSTEM

(71) Applicant: SIKA TECHNOLOGY AG, Baar (CH)

(72) Inventors: Yang Soo Lee, Anyang-si (KR); Jy Kang, Goyang-si (KR); Sangyong Kim, Seoul (KR)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/341,969

(22) PCT Filed: Dec. 21, 2017

(86) PCT No.: PCT/EP2017/084182
§ 371 (c)(1),
(2) Date: Apr. 15, 2019

(87) PCT Pub. No.: WO2018/122113
PCT Pub. Date: Jul. 5, 2018

(65) Prior Publication Data
US 2019/0242116 A1    Aug. 8, 2019

(30) Foreign Application Priority Data
Dec. 30, 2016 (KR) ................. 10-2016-0183494

(51) Int. Cl.
| | |
|---|---|
| *E21D 11/38* | (2006.01) |
| *E04B 1/64* | (2006.01) |
| *B32B 7/12* | (2006.01) |
| *E04B 1/66* | (2006.01) |
| *B32B 5/02* | (2006.01) |

(Continued)

(52) U.S. Cl.
CPC .............. *E04B 1/64* (2013.01); *B32B 5/02* (2013.01); *B32B 5/022* (2013.01); *B32B 7/12* (2013.01); *B32B 9/005* (2013.01); *B32B 27/12* (2013.01); *E04B 1/665* (2013.01); *E21D 11/10* (2013.01);
(Continued)

(58) Field of Classification Search
CPC ................. E21D 11/383; E04B 1/64
See application file for complete search history.

(56) References Cited

U.S. PATENT DOCUMENTS

| | | | |
|---|---|---|---|
| 6,761,504 B1 | 7/2004 | Brandenberger et al. | |
| 2013/0302557 A1* | 11/2013 | Cisneros | E02D 31/02 428/99 |

(Continued)

FOREIGN PATENT DOCUMENTS

| | | | | | |
|---|---|---|---|---|---|
| EP | 0725185 A1 | * | 8/1996 | ........... | E21D 11/105 |
| EP | 2837768 B1 | * | 1/2018 | ........... | E21D 11/105 |

(Continued)

OTHER PUBLICATIONS

KR 2018004450A Machine_translate.pdf (Year: 2018).*
(Continued)

*Primary Examiner* — Babajide A Demuren
(74) *Attorney, Agent, or Firm* — Oliff PLC (57) ABSTRACT

A waterproofing system including at least two different layers, one layer being a mounting layer and one other layer being a functional layer, the two layers being directly or indirectly connected to each other over at least parts of their opposing surfaces, wherein the functional layer includes at least a thermoplastic polymer and at least a mineral binder.

18 Claims, 5 Drawing Sheets

(51) Int. Cl.
  *E21D 11/10* (2006.01)
  *B32B 9/00* (2006.01)
  *B32B 27/12* (2006.01)

(52) U.S. Cl.
  CPC .... *E21D 11/383* (2013.01); *B32B 2307/7265* (2013.01); *B32B 2419/00* (2013.01)

(56) References Cited

U.S. PATENT DOCUMENTS

| | | |
|---|---|---|
| 2015/0052847 A1 | 2/2015 | Wiercinski et al. |
| 2015/0352809 A1 | 12/2015 | Kohlman et al. |

FOREIGN PATENT DOCUMENTS

| | | | |
|---|---|---|---|
| JP | 3737211 B2 | | 1/2006 |
| KR | 2018004450 A | * | 1/2018 |
| WO | 98/24738 A1 | | 6/1998 |
| WO | 2017/108826 A1 | | 6/2017 |
| WO | 2017/108843 A1 | | 6/2017 |
| WO | 2017/108844 A1 | | 6/2017 |
| WO | 2017/108846 A1 | | 6/2017 |

OTHER PUBLICATIONS

Mar. 13, 2018 Search Report issued in International Patent Application No. PCT/EP2017/084182.
Mar. 13, 2018 Written Opinion issued in International Patent Application No. PCT/EP2017/084182.
Jun. 28, 2020 Office Action issued in Chinese Patent Application No. 201780070833.7.

* cited by examiner

WATERPROOFING SYSTEM

TECHNICAL FIELD

The invention relates to a waterproofing system for use in the construction industry, particularly for sealing concrete structures such as foundations, buildings, tunnels and the like against water ingress.

BACKGROUND ART

Waterproofing systems, typically membranes, are commonly used in the construction industry for sealing concrete structures against water ingress.

Waterproofing systems according to the prior art typically consist of a membrane as the main layer to provide water tightness. Such membranes are being laid out on a substrate typically prepared from blinding concrete or shotcrete and are to some extent fixed to this substrate by a mounting layer and optionally additional mounting elements if required. Typical membranes are made of polymers, particularly thermoplastics such as plasticized polyvinylchloride (p-PVC) and thermoplastic polyolefins (TPO) or elastomers such as ethylene-propylene diene monomer (EPDM) and cross-linked chlorosulfonated polyethylene (CSPE). One of the drawbacks of polymer-based waterproofing membranes is their poor or non-existing adhesion properties. Typically such membranes show low bonding strength to adhesives or to cementitious materials that are commonly used in the construction industry. Therefore, a specific contact layer, for example, a fleece backing, is typically used to provide sufficient bonding of the membrane and the structure to be waterproofed.

In waterproofing applications, the membrane is typically post-applied to an existing concrete structure. In this case the membrane is bonded with an adhesive or a sealing tape via its contact layer to the surface of the concrete structure to be waterproofed. In pre-applied waterproofing applications, however, the membrane is laid out before the concrete structure to be waterproofed is built. In this case, the membrane is placed on an underlying structure, typically on a blinding concrete layer or a shotcrete layer in tunneling applications or a formwork and fresh concrete is then cast against the surface of the contact layer, thereby fully and permanently bonding the membrane to the surface of the hardening concrete.

In pre-applied waterproofing applications, typically an adhesive is used, to bond the membrane to the contact layer and to the fresh concrete cast against the contact layer. The adhesive should also enable the fresh concrete to penetrate deeply into to contact layer before hardening in order to provide mechanical interaction between the contact layer and the concrete and thus high resistance to penetrating water.

One of the main challenges related to the waterproofing systems is to ensure watertightness after water ingress in case of leak in the membrane. In this regard watertightness means that the waterproofing system should be able to prevent the infiltrated water from penetrating and spreading out to the space between the membrane and the waterproofed surface. A leak in the barrier layer can be a result of inward growing tree roots, material failure or tensile or shear forces directed to the membrane. If the watertightness after ingress is lost, water is able to flow laterally underneath the membrane and to invade the interior of the building structure. In such cases the exact location of the leak in the barrier layer is also difficult to detect.

One disadvantage of often used multilayer waterproofing membranes of the prior art is related to the use of adhesives, which increase the complexity of the membrane build-up and consequently the production costs of such membranes. The adhesive has to provide good binding to the low surface energy polymers in the membrane, form a strong bond to the specific contact layer and to fresh concrete and have a good resistance to varying temperature ranges, UV irradiation and oxidation. Adhesives fulfilling all the requirements are expensive and may significantly increase the production cost of such membranes.

Another disadvantage of known multilayer waterproofing membranes is related to the use of fleece backings as contact layers to provide sufficient bonding between the membrane and the substrate to be waterproofed. In waterproofing and roofing applications the membrane sheets have to be homogenously joined to each other in a reliable way to ensure watertightness of the sealing construction. Membranes having a fleece backing may not be joined so easily by heat welding but instead the edges of the membranes have to be bonded together either with an adhesive or with a sealing tape adhered on top of the seam and/or under the seam. The use of an adhesive or a sealing tape to join neighboring membrane sheets complicates the installation process and increases application costs.

SUMMARY OF THE INVENTION

The objective of the present invention is to provide a waterproofing system for use in the construction industry, particularly for sealing concrete structures such as foundations, buildings, tunnels and the like against water ingress and which fully and permanently bonds to concrete and other cementitious compositions cast onto the system after setting, as well as to adhesives commonly used in the construction industry. The waterproofing system should furthermore retain watertightness after infiltration in case of a leaking barrier layer and prevent water from laterally spreading out between the waterproofing system and the building structure to be waterproofed. Still the waterproofing system should have good heat welding properties and good stability against mechanical stress.

According to the invention, the aforementioned objectives are achieved with the waterproofing system according to claim 1 of the present invention.

The main concept of the invention is that the waterproofing system comprises at least two different layers, one layer being a mounting layer and one other layer being a functional layer, the two layers being directly or indirectly connected to each other over at least parts of their opposing surfaces, wherein the functional layer comprises at least a thermoplastic polymer and at least a mineral binder.

The mounting layer enables the mounting or fixing of the waterproofing system on an underlying structure or a formwork, typically a blinding concrete layer or a shotcrete layer.

The functional layer enables the membrane to be fully bonded to concrete or cementitious compositions after hardening as well as to adhesives commonly used in the construction industry.

Compared to waterproofing membranes of the prior art, waterproofing systems according to the present invention have the advantage of being integrally connected to the concrete or cementitious layer cast or applied on the functional layer. This on one hand significantly improves waterproofing properties of the system by preventing lateral water flow between the waterproofing system and the concrete structure to be waterproofed in case of leakage of the system, i.e. lateral pressure flow resistance is significantly increased over known systems. On the other hand the firmly bonded waterproofing system gives the concrete structure additional strength and provides for a better stress distribution. Furthermore it acts as an additional reinforcement to the concrete and may prevent loose concrete pieces overhead to fall down in case of damages to the structure.

Another advantage of the present invention is that the waterproofing system has good heat welding properties, which means that layers of the system can be homogeneously joined by heat welding instead of using an adhesive or a sealing tape to bond overlapping sheets.

DETAILED DESCRIPTION OF THE INVENTION

The present invention relates to a waterproofing system comprising at least two different layers, one layer being a mounting layer and one other layer being a functional layer, the two layers being directly or indirectly connected to each other over at least parts of their opposing surfaces, wherein the functional layer comprises at least a thermoplastic polymer P1 and at least a mineral binder and wherein the mounting layer comprises an adhesive and/or a fabric.

In one embodiment of the invention, the waterproofing system comprises one additional barrier layer located between the mounting layer and the functional layer. Thereby the barrier layer and the mounting layer are connected to each other over at least parts of their opposing surfaces and the functional layer is integrally connected to the barrier layer over its entire surface.

The mounting layer of the waterproofing system serves the purpose of providing the ability that the waterproofing system is mounted and/or fixed to a substrate via the mounting layer. This substrate may be of any type, typically soil or rock material or any other type of underlying structure. Preferably the substrate is a blinding concrete layer or a shotcrete layer, e.g. in tunneling applications, or a formwork. The mounting layer preferably comprises an adhesive, a fabric, a tape, typically a double sided tape, or a combination thereof.

The mounting layer may be present continuously on the functional layer or on the barrier layer, if such a barrier layer is present, i.e. over its entire surface, or discontinuously, i.e. over parts of its surface only.

In case the mounting layer comprises an adhesive it may comprise an adhesive in combination with a carrier material like a fabric, a grid or the like or consists of an adhesive material only. Suitable adhesives are for example reactive or non-reactive, one- or multi-component adhesives like polyurethanes, polyurethane hybrids based on silane functional polyurethanes, epoxy resins, acrylics, silicones, water-based adhesives, cementitious compositions or any mixtures thereof. Preferred adhesives are contact adhesives, pressure sensitive adhesives and/or hot-melt adhesives of any chemical basis mentioned above.

In case the mounting layer is a fabric, it can be a woven or a non-woven fabric made of any natural or synthetic materials. The fabric may be connected to the functional layer, optionally over an additional element or layer such as the optional barrier layer, over the entire surface of the functional layer or the barrier layer or spot-wise. Thereby the fabric may be attached by means of an adhesive as described above, a double sided tape or by mechanical means provided that the functional layer and the optional barrier layer remain in working order. Optional mechanical fastening may be done by melting the surface of layer on which the fabric is attached to and embedding the fabric into the melt before cooling it down again. Preferably the fabric is a non-woven fabric made of a synthetic material which is preferably heat-weldable with the thermoplastic polymer P1 of the functional layer or with the thermoplastic polymer P2 of the barrier layer if such a layer is present. In this case the fabric is preferably connected to the functional layer or the barrier layer through heat-welding. Preferably the fabric is made of polyester or a polyolefin like polyethylene or polypropylene.

The fabric may further comprise additional mounting elements that facilitate mounting of the waterproofing system to a substrate. Such additional mounting elements may be protruding pieces or strips of fabric preferably of the same material as the fabric mounting layer and attached to that, particularly in patches, spots or sections. In case the fabric is made of a thermoplastic material, the additional mounting elements may be welded onto the fabric mounting layer. The additional mounting elements may also be sewed on to the fabric mounting layer.

Said additional mounting elements of the mounting layer may also be adhesively bonded to the functional layer or the barrier layer and thus constituting the mounting layer as such.

It is preferred that the mounting layer allows water drainage in the area between the substrate and the functional layer or the barrier layer in case such a layer is present. Thereby the occurrence of ponding water on the waterproofing system is avoided. It is thus preferred that the mounting layer as a whole is water-permeable. If the mounting layer comprises or consists of an adhesive or a tape, this effect can be achieved by applying the mounting layer discontinuously on the functional layer or on the barrier layer, typically in the form of spots, patches, stipes and the like. If the mounting system comprises or consists of a fabric, the effect can be achieved by selecting a fabric that is water-permeable.

Using a fabric, particularly a fabric spot-welded onto the functional layer or the barrier layer, as a mounting layer on the waterproofing system has the advantage that besides serving as a mounting layer, the fabric allows drainage of water getting to the waterproofing system towards the structure to be waterproofed. This is particularly preferred in case the waterproofing system is used to seal structures with vertical walls like tunnels. Water can then flow through the fabric along the outer side the waterproofed structure.

An additional advantage of using a fabric as a mounting layer is that it protects the functional layer or the barrier layer from mechanical impact during handling or application, e.g. caused by stones and the like from the substrate.

The mounting layer, the functional and the optional barrier layer are typically sheet-like elements having first and second surfaces defined by peripheral edges. The opposing surfaces of the mounting layer and the functional layer are connected to each other either directly, i.e. the two layers are in direct contact to each other and no further element or layer is present between the two layers, or indirectly, i.e. an additional element, particularly a third layer, is located between the mounting layer and the functional layer in a way that both of these layers are connected to said additional element. At the transition area between the layers, the materials forming the layers can also be present mixed with each other.

As thermoplastic polymer P1 of the functional layer, any kind of thermoplastic polymer is in principle suitable to be used. Preferably, the thermoplastic polymer P1 comprises at least one polymer selected from the group consisting of ethylene-vinyl acetate copolymers (EVA), ethylene-acrylic ester copolymers, ethylene-α-olefin co-polymers, ethylene-propylene co-polymers, polypropylene (PP), polyethylene (PE), particularly low density polyethylene (LDPE), linear low density polyethylene (LLDPE), high density polyethylene (HDPE), polyvinylchloride (PVC), polyethylene terephthalate (PET), polystyrene (PS), polyamides (PA), chlorosulfonated polyethylene (CSPE), ethylene propylene diene rubber (EPDM), polyisobutylene (PIB), and mixtures thereof.

Preferably the thermoplastic polymer P1 comprises at least one polymer selected from the group consisting of EVA, ethylene-acrylic ester copolymers, ethylene-α-olefin co-polymers, and ethylene-propylene co-polymers, and mixtures thereof with PE, particularly LDPE, LLDPE or HDPE.

The amount of the thermoplastic polymer P1 is preferably 20-85 wt.-%, more preferably 30-80 wt.-%, even more preferably 35-75 wt.-%, most preferably 40-70 wt.-%, based on the total weight of the functional layer.

The glass transition temperature ($T_g$) of the thermoplastic polymer P1 is preferably below the temperatures occurring during the use of the waterproofing system. It is therefore preferred that the $T_g$ of the thermoplastic polymer P1 is below 0° C., more preferably below −15° C., most preferably below −30° C.

The term "glass transition temperature" refers to the temperature measured with DSC according to ISO 11357 standard above which temperature a polymer component becomes soft and pliable, and below which it becomes hard and glassy. The measurements can be performed with a Mettler Toledo 822e device at a heating rate of 2° C./min. $T_g$ values can be determined from the measured DSC curve with the help of the DSC software.

Preferably, the mineral binder present in the functional layer comprises at least one component selected from the group consisting of a hydraulic binder, a non-hydraulic binder, a latent hydraulic binder, a puzzolanic binder and mixtures thereof. The mineral binder can further comprise inert substances such as sand, calcium carbonate, e.g. produced from chalk, limestone or marble by grinding and/or precipitation, crystalline silicas, talc, pigments, and mixtures thereof. According to one or more embodiments, the mineral binder comprises at least one inert mineral filler selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, and zeolites. The term "inert mineral filler" designates substances, which, unlike mineral binders, are not reactive with water, i.e. do not undergo a hydration reaction in the presence of water. According to one more embodiments, the mineral binder comprises 1-60 wt.-%, preferably 2.5-55 wt.-%, more preferably 5-50 wt.-%, most preferably 10-40 wt.-%, of at least one inert mineral filler, preferably selected from the above presented group of inert mineral fillers.

The term "mineral binder" designates a binder, which in the presence of water reacts in a hydration reaction under formation of solid hydrates or hydrate phases. In particular, the term "mineral binder" refers to non-hydrated mineral binders, i.e. mineral binders, which have not been mixed with water and reacted in a hydration reaction.

The term "hydraulic binder" designates substances that harden as a result of chemical reactions with water ("hydration reactions") and produce hydrates that are not water-soluble. In particular, the hydration reactions of the hydraulic binder take essentially place independently of the water content. This means that hydraulic binders can harden and retain their strength even when exposed to water, for example underwater or under high humidity conditions. Examples of hydraulic binders include cement, cement clinker and hydraulic lime. In contrast, "non-hydraulic binders" such as air-slaked lime (non-hydraulic lime) and gypsum, are at least partially water soluble and must be kept dry in order to retain their strength.

The term "cement" designates ground hydraulic binders, which apart from the hydraulic binders as the main constituents, usually contain small quantities of calcium sulfate (gypsum and/or hemihydrate and/or anhydrite), and optionally secondary constituents and/or cement additives such as grinding aids. The main constituents are contained in quantities of more than 5% by weight. The main constituents can be Portland cement clinker, also referred to as clinker or cement clinker, slag sand, natural or artificial pozzolans, fly ash, for example, siliceous or calcareous fly ash, burnt shale, limestone and/or silica fume. As secondary constituents, the cements can contain up to 5% by weight of finely divided inorganic, mineral substances, which originate from clinker production.

The term "gypsum" designates any known form of gypsum, in particular calcium sulfate dehydrate, calcium sulfate α-hemihydrate, calcium sulfate ß-hemihydrate, or calcium sulfate anhydrite or mixtures thereof.

The term "latent hydraulic binders" designates particular type II concrete additives with latent hydraulic character according to DIN EN 206-1:2000. These materials are calcium aluminosilicates that are not able to harden directly or harden too slowly when mixed with water. The hardening process is accelerated in the presence of alkaline activators, which break the chemical bonds in the binder's amorphous (or glassy) phase and promote the dissolution of ionic species and the formation of calcium aluminosilicate hydrate phases. Examples of latent hydraulic binders include granulated blast furnace slag.

The term "pozzolanic binders" designates in particular type II concrete additives with pozzolanic character according to KS L 5210 (DIN EN 206-1:2000). These materials are siliceous or aluminosilicate compounds that react with water and calcium hydroxide to form calcium silicate hydrate or calcium aluminosilicate hydrate phases. Pozzolanic binders include natural pozzolans such as trass and artificial pozzolans such as fly ash and silica fume.

The mineral binder preferably comprises a hydraulic binder, in particular cement or cement clinker. The mineral binder can further comprise latent hydraulic and/or pozzolanic binders, preferably slag and/or fly ash. In one advantageous embodiment, the mineral binder contains 5-50 wt.-%, preferably 5-40 wt.-%, more preferably 5-30 wt.-% of latent hydraulic and/or pozzolanic binders, preferably slag and/or fly ash and at least 35 wt.-%, more preferably at least 65 wt.-% of hydraulic binder, preferably cement or cement clinker based on the total weight of the mineral binder.

Preferably, the mineral binder is a hydraulic binder, preferably cement.

The cement can be any conventional cement, for example, one in accordance with the five main cement types according to KS L 5210 (DIN EN 197-1): namely, general Portland cement (CEM I), moderate heat Portland cement (CEM II), rapid hardening Portland cement (CEM III), low heat Portland cement (CEM IV) and sulfate resistant Portland cement (CEM V). Naturally, all other cements that are produced according to another standard are also suitable, for example, according to ASTM standard or EN standard or Indian standard. To the extent that reference is made here to cement types according to KS L standard, this naturally also relates to the corresponding cement compositions which are produced according to another cement standard.

The mineral binder is preferably present in the functional layer in the form of finely divided particles, in order to obtain a functional layer with uniform surface properties. The term "finely divided particles" refers to particles, whose median particle size $d_{50}$ does not exceed 500 μm. The term median particle size $d_{50}$ refers to a particle size below which 50% of all particles by volume are smaller than the $d_{50}$ value.

The term "particle size" refers to the area-equivalent spherical diameter of a particle. The particle size distribution can be measured by laser diffraction according to the method as described in standard ISO 13320:2009. For determination of the particle size distribution, the particles are suspended in water (wet dispersion method). A Mastersizer 2000 device (trademark of Malvern Instruments Ltd, GB) can be used in measuring particle size distribution.

Preferably the median particle size $d_{50}$ of the mineral binder is 1-300 μm, more preferably 1.5-250 μm, even more preferably 2-200 μm, most preferably 2-150 μm.

Preferably, less than 40 wt.-%, more preferably less than 30 wt.-% based on the total weight of the mineral binder, even more preferably less than 20-wt.-%, most preferably less than 10 wt.-% of the particles of the mineral binder have a particle size of less than 5 μm and preferably less than 40 wt.-%, more preferably less than 30 wt.-%, even more preferably less than 20-wt.-%, most preferably less than 10 wt.-% of the particles of the mineral binder have a particle size of above 100 μm.

Preferably, the overall particle size of the mineral binder (of at least 98 percent of the particles) is below 250 μm, more preferably below 200 μm, even more preferably below 100 μm.

Preferably, the particles of the mineral binder are distributed throughout the entire volume of the functional layer. The term "distributed throughout the entire volume" in understood to mean that the mineral binder is present in essentially all portions of the functional layer but it does not necessarily imply that the distribution is uniform throughout the functional layer. It may, however, be preferable that the mineral binder is uniformly distributed throughout the entire volume of the functional layer. For a person skilled in the art it is clear that even if the mineral binder is "uniformly distributed", there may be regions in the functional layer, which have a slightly higher concentration of the mineral binder than other regions and that a 100% uniform distribution is generally not achievable.

The amount of the mineral binder in the functional layer should be high enough to enable sufficient strength of adhesion by which the functional layer is bonded to cementitious compositions. On the other hand, increasing the amount of the mineral binder also increases the stiffness of the functional layer, which may make the system unsuitable for certain sealing applications.

The amount of the mineral binder in the functional layer is typically 10-90 wt.-%, preferably 20 to 80 wt.-%, more preferably 25 to 60 wt.-%, most preferably 30-50 wt.-%, based on the total weight of the functional layer.

In case the waterproofing system according to the present invention is built up from a mounting layer and a functional layer without a further barrier layer, the amount of mineral binder is typically in the lower range, typically not more than 50 wt.-% based on the total weight of the functional layer. If a barrier layer ensuring water-tightness is present and the functional layer has the main objective to ensure the connection of the waterproofing system to the cementitious composition, typically concrete, the amount of mineral binder may be selected to be in the higher range, typically between 40 to 70 wt.-% based on the total weight of the functional layer.

The surface of the functional layer is preferably rough and to some extent porous. This allows a wet cementitious composition or also an adhesive applied on the functional layer to bond the waterproofing system onto a surface of a structure to enter the pores of the functional layer and establish an additional mechanical connection between the system and the structure to be waterproofed. Roughness and porosity of the functional layer are typically achieved by adding a foaming or a blowing agent to the material of which the functional layer is made of before or during production.

In waterproofing applications, one of the most important characteristics is the strength of adhesion by which waterproofing system is bonded to a substrate, for example a concrete surface, to be sealed against water ingress. In case the strength of adhesion is too low, gaps are more easily formed between the system and the surface of the substrate, which may lead to loss of watertightness.

Preferably, the adhesion strength of the functional layer of the waterproofing system on concrete is at least 5 N/50 mm, more preferably of at least 10 N/50 mm, even more preferably of at least 15 N/50 mm, most preferably of at least 20 N/50 mm. In particular, the waterproofing system has concrete adhesion strength of at least 30N/50 mm, preferably of at least 35 N/50 mm, more preferably of at least 40 N/50 mm, even more preferably of at least 45 N/50 mm, most preferably of at least 50 N/50 mm. Preferably, the functional layer of the waterproofing system has concrete adhesion strength in the range of 5-400 N/50 mm, more preferably of 10-350 N/50 mm, even more preferably of 15-300 N/50 mm, most preferably of 20-250 N/50 mm.

The term "concrete adhesion strength" refers to the average concrete adhesion strength [N/mm] per unit width of the waterproofing system upon peeling is from a surface of a concrete specimen, which has been casted on the surface of the functional layer and hardened for 28 days under standard conditions (air temperature 23° C., relative air humidity 50%).

A detailed description of the measurement method for the concrete adhesion strength is in the experimental part of the present specification.

Preferably the functional layer of the waterproofing system further comprises a surfactant, typically selected from the group consisting of anionic, cationic, non-ionic, amphoteric surfactants, polymeric surfactants, and mixtures thereof. "Surfactant" thereby designates surface tension lowering substances, which usually are organic compounds containing both hydrophobic and hydrophilic groups.

Preferred surfactants are selected from the group consisting of glycerol monostearates, polycarboxylate ethers, polyether-modified polysiloxanes, polyalkylene oxide siloxanes, hydroxyethyl amines, erucamides, stearyl stearamides, alkali metal alkanesulfonates, alkyl aryl sulfonates and mixtures thereof. The preferred amount of the surfactant is 0.1-10 wt.-%, preferably 0.5-5 wt.-%, more preferably 1-3 wt.-%, based on the total weight of the functional layer.

Preferably, the functional layer comprises at least two different surfactants selected from the above mentioned ones. This may result in an improvement of the concrete adhesion strength of the functional layer.

Typically, the functional layer contains only small amounts of water before it is contacted with a fresh cementitious composition, i.e. a cementitious compositions before hardening, particularly before setting. Preferably, the amount of water in the functional layer is less than 5 wt.-%, preferably less than 3 wt.-%, even more preferably less than 1.5 wt.-%, based on the total weight of the functional layer. In particular, the amount of water in the functional layer is less than 2 wt.-%, preferably less than 1 wt.-%, even more preferably less than 0.5 wt.-%, based on the total weight of the functional layer.

The mineral binder in the functional layer should remain in substantially non-hydrated state at least until the functional layer is contacted with a composition containing water, such as fresh cementitious composition. Hydration of the mineral binder particles contained in the functional layer would decrease the flexibility and thus deteriorate the handling properties of the waterproofing system. It would likely also affect negatively the concrete adhesion strength of the functional layer.

Preferably, the functional layer comprises less than 1 wt.-%, preferably less than 0.5 wt.-%, most preferably less than 0.1 wt.-% of hydrated mineral binders. In case the functional layer contains hydrated mineral binders, it is essential that these do not form interconnected solid networks.

The functional layer may further comprise additives such as UV- and heat stabilizers, plasticizers, foaming agents, dyes, colorants, pigments, matting agents, antistatic agents, impact modifiers, flame retardants, and processing aids such as lubricants, slip agents, antiblock agents, and denest aids.

There are no particular restrictions for the thickness of the functional layer. However, the functional layer preferably has a thickness of 0.01-10 mm, preferably 0.05-5 mm, more preferably 0.1-2 mm, most preferably 0.2-1 mm. The thickness of the functional layer can be measured according to EN 1849-2.

In case the waterproofing system comprises a functional layer and a mounting layer only but no additional barrier layer, the functional layer must be configured to be water tight, which may influence the preferred thickness of the functional layer. In case an additional barrier layer is present and the functional layer only serves the purpose of connecting the waterproofing system to the concrete structure, a thinner functional layer may be sufficient.

It is preferable that the functional layer has a certain flexibility to allow the waterproofing system to be wound into rolls, typically during production, and then easily applied to a surface of a substrate.

The functional layer preferably has a mass per unit area of 100-10000 g/m$^2$, more preferably of 200-6000 g/m$^2$, even more preferably of 300-3000 g/m$^2$. The mass per unit area can be measured according to DIN EN 1849-2 standard.

The density of the functional layer is preferably 0.25-3.00 g/cm$^3$, particularly 0.30-2.75 g/cm$^3$, more preferably 0.35-2.50 g/cm$^3$, even more preferably 0.4-2.0 g/cm$^3$, most preferably 0.5-1.5 g/cm$^3$. The density of the functional layer can be determined using the buoyancy method.

The barrier layer optionally present in the waterproofing system and located between the mounting layer and the functional layer typically comprises a thermoplastic polymer P2, which is selected from the same group of polymers from which the thermoplastic polymer P1 is selected. Thermoplastic polymers P2 and P1 however may be selected independently from each other.

Preferably, the thermoplastic polymer P2 of the barrier layer is miscible with the thermoplastic polymer P1 of the functional layer. More preferably, the thermoplastic polymer P2 is compatible with the thermoplastic polymer P1, i.e. the two thermoplastic polymers and thus the barrier layer and the functional layer are weldable with each other and may be homogenously joined by heat welding.

According to one embodiment, the thermoplastic polymer P1 and the thermoplastic polymer P2 comprise at least common polymer, more preferably the thermoplastic polymer P1 and the thermoplastic polymer P2 are identical.

The content of the thermoplastic polymer P2 in the barrier layer is preferably at least 50 wt.-% based on the total weight of the barrier layer. More preferably the content of the thermoplastic polymer P2 is at least 60 wt.-%, even more preferably at least 70 wt.-%, most preferably at least 80 wt.-%, based on the total weight of the barrier layer.

The barrier layer can comprise, additives and processing agents, such as fillers, UV and heat stabilizers, plasticizers, lubricants, biocides, flameproofing agents, antioxidants, pigment, such as for example titanium dioxide or carbon black, dyes, and colorants.

The thickness of the barrier layer is not subjected to any particular restrictions. However, preferred barrier layers have a thickness in the range of 0.1-10 mm, more preferably 0.5-7.5 mm, most preferably 1-5.0 mm. Thickness, of the layer can be determined by using the measurement method as defined in DIN EN 1849-2.

It is preferable that the barrier layer is in the form of a flexible plastic layer. This allows the membrane to be wound into rolls, typically during production, and then easily applied to a surface of a substrate.

Furthermore it is preferred that the barrier layer is weldable with the functional layer. "Weldable" means here that the layers can be homogenously joined to each other by heat welding.

Further preferred characteristics of the barrier layer are independent of each other but preferably altogether an impact resistance of 200-1500 mm measured according to EN 12691: 2005, a longitudinal and transversal tensile strength of at least 5 MPa at a temperature of 23° C. measured according to DIN ISO 527-3, a longitudinal and transversal elongation at break of at least 300% at a temperature of 23° C. measured according to DIN ISO 527-3, a water resistance at 0.6 bar for 24 hours measured according to EN 1928 B, and a maximum tear strength of at least 100 N measured according to EN 12310-2.

Suitable barrier layers may be selected from known waterproofing membranes according to the state of the art.

Mechanical performance of the waterproofing system is particularly required if it is used for waterproofing of uneven concrete surfaces. In this case it is necessary to ensure that the waterproofing system is not broken due to the pressure of the concrete casted on its surface or due to local stresses applied to the system stretched over concave parts of the surface.

Another important characteristic of systems used in waterproofing applications is the watertightness after water ingress. Watertightness after ingress describes the ability of the system to resist spreading of infiltrated water in the space between the membrane and the waterproofed surface or between the layers of the membrane after leakage.

The watertightness after infiltration can be measured with a modified watertightness test based on the ASTM 5385 standard measurement method. In the modified watertightness test ASTM 5385M, a hole with a diameter of 10 mm is punched to the waterproofing system, which is then adhered to a concrete slab. The watertightness of the punched waterproofing system is tested with the same kind of apparatus as described in the original ASTM 5385 method. The water pressure inside the test apparatus is increased to a value between 0.25 and 7 bar and the test is continued for a specified time period. At the end of the test, the concrete slab is removed from the test apparatus and at least part of the waterproofing system is peeled off from the concrete surface to determine, how far the water has invaded between the concrete surface and the waterproofing system and/or between different layers thereof. In case only a small area, such as a circle with a diameter of 2.50 mm or less, near the hole is affected by water, the waterproofing system is considered to be watertight after water ingress according to ASTM 5385M.

Preferably, the waterproofing system is considered watertight after water ingress according to ASTM 5385M, when the test is conducted at a pressure of 7 bars and continued for 7 days. This result is achieved with the waterproofing system according to the present invention.

In case a barrier layer is present in the waterproofing system, the interlayer peel strength between the barrier layer and the functional layer is at least 50 N/50 mm, more preferably at least 100 N/50 mm, most preferably at least 200 N/50 mm.

The term "interlayer peel strength" refers to the average peeling resistance (N) per 50 mm of the functional layer upon peeling it from one edge at an angle of 180° from the barrier layer. The interlayer concrete adhesion strength is measured according to the T-concrete adhesion strength test according to ISO 1139 standard.

It has been also discovered that the waterproofing system of the present invention can be joined by heat welding and that the welded joint is considered satisfactory for waterproofing applications.

The functional layer of the waterproofing system and the optional barrier layer can be produced by extruding, calendering, compressing or casting processes.

Methods for producing said layers are disclosed in PCT applications no. PCT/EP2016/081977, PCT/EP2016/082003, PCT/EP2016/082004 and PCT/EP2016/082009, which are hereby incorporated by reference.

The functional layer is preferably obtained by melt-processing a composition containing the thermoplastic polymer P1 and the mineral binder to a homogenized melt and shaping the homogenized melt to an article, such as to a sheet or a film, by using any conventional means, such as extrusion, calendaring, compressing, or casting techniques. Preferably, the homogenized melt is substantially free of water. In particular, the amount of water in the homogenized melt is preferably less than 5.0 wt.-%, preferably less than 2.5 wt.-%, more preferably less than 1.0 wt.-%, based on the total weight of the homogenized melt.

The mounting layer is typically applied to the functional layer or the barrier layer in a separate step.

In another aspect the present invention relates to a method for producing a building structure sealed against water penetration comprising the steps of:

optionally applying a first layer of concrete, particularly a blinding concrete layer or a shotcrete layer, onto a surface of a substrate;

installing a waterproofing system as described above onto a surface of a substrate, particularly on the surface of a first layer of concrete, in a way that the mounting layer of the waterproofing system is facing the surface of the substrate, particularly of the first layer of concrete and is at least partially connected to the surface of the substrate, particularly or the first layer of concrete;

applying a, particularly second, layer of concrete, typically a reinforced concrete layer, particularly a concrete lining layer, onto the waterproofing system in a way that the functional layer of the waterproofing system is facing the surface of the, particularly second, layer of concrete and at least partially connected to the surface of the, particularly second, layer of concrete.

The waterproofing system is mounted or fixed to the substrate, particularly to a first layer of concrete typically in the form of a blinding concrete layer or a shotcrete layer by means of the mounting layer. In case the mounting layer comprises an adhesive, the waterproofing system is at least partially bonded to the substrate via this adhesive. In case the mounting layer comprises a fabric, the waterproofing system is typically attached to the substrate by nails or screws or the like which are directly applied through the fabric, preferably through the additional mounting elements to facilitate mounting, into the substrate.

The particularly second layer of concrete is typically casted over the waterproofing system and after hardening can be part of a structure, in particular, an above-ground or underground structure, for example a building, garage, tunnel, landfill, water retention, pond, dike or an element for use in pre-fabricated constructions.

In another aspect the present invention relates to a waterproofed construction comprising at least one layer of concrete and a waterproofing system as described above, wherein either the mounting layer or the functional layer is connected to the layer of concrete. Thereby the at least one layer of concrete is preferably a reinforced concrete layer and the functional layer of the waterproofing system is integrally connected to the reinforced concrete layer over its entire surface.

Typically the waterproofed construction further comprises a blinding concrete layer or a shotcrete layer located adjacent to the waterproofing system in a way that the mounting layer of the waterproofing system is at least partially connected to the blinding concrete layer or the shotcrete layer.

The waterproofed construction can be any type of construction and is typically a building, a garage, a tunnel, a landfill, a water retention, a pond, a dike or an element for use in pre-fabricated constructions. Most preferably the waterproofed construction is a tunnel.

DETAILED DESCRIPTION OF THE DRAWINGS

Figure 1:
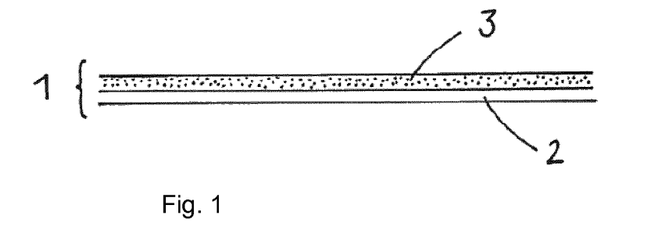
FIG. 1 shows a cross-section of a waterproofing system having a mounting layer and a functional layer.

FIG. 1 shows a cross-section of a waterproofing system 1 having a mounting layer 2 and a functional layer 3, wherein the mounting layer 2 is fully bonded to the functional layer 3. In such an embodiment the mounting layer 2 is typically an adhesive.

Figure 2:
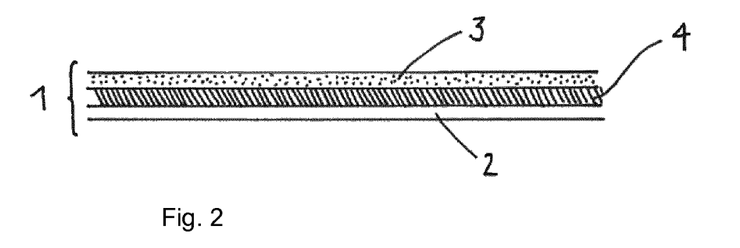
FIG. 2 shows a cross-section of a waterproofing system having a mounting layer, an optional barrier layer and a functional layer.

FIG. 2 shows a cross-section of a waterproofing system 1 having a mounting layer 2, a barrier layer 4 and a functional layer 3. Both the functional layer 3 and the mounting layer 2 are fully bonded to the barrier layer 4. In such an embodiment the mounting layer 2 is typically again an adhesive.

Figure 3:
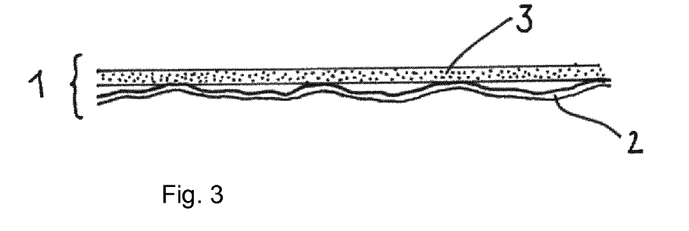
FIG. 3 shows a cross-section of a waterproofing system having a mounting layer in the form of a fabric and a functional layer.

FIG. 3 shows a cross-section of a waterproofing system 1 having a mounting layer 2 in the form of a fabric and a functional layer 3. The fabric is thereby connected to the functional layer 3 only spot-wise. Typically such a fabric is spot-welded to the functional layer 3.

Figure 4:
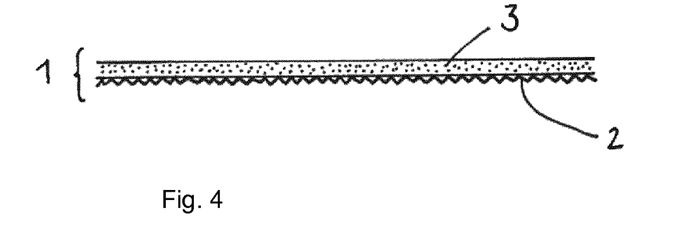
FIG. 4 shows a cross-section of a waterproofing system having a mounting layer in the form of an adhesive and a functional layer.

FIG. 4 shows a cross-section of a waterproofing system 1 having a mounting layer 2 in the form of an adhesive and a functional layer 3.

Figure 5:
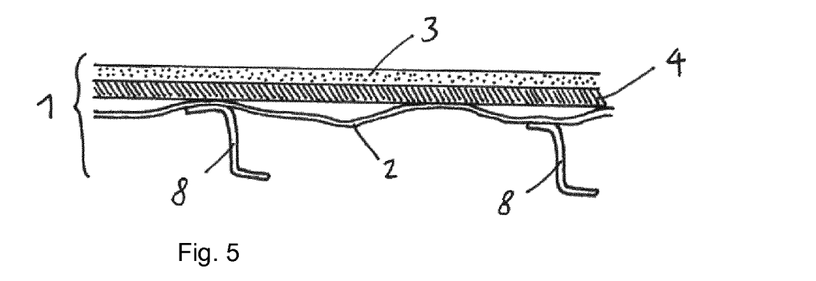
FIG. 5 shows a cross-section of a waterproofing system having a mounting layer, an optional barrier layer and a functional layer, wherein the mounting layer is in the form of a fabric attached spot-wise to the barrier layer and further comprising additional mounting elements to facilitate mounting of the waterproofing system to a substrate.

FIG. 5 shows a cross-section of a waterproofing system 1 having a mounting layer 2, a barrier layer 4 and a functional layer 3, wherein the mounting layer 2 is in the form of a fabric attached spot-wise to the barrier layer 4 and further comprising additional mounting elements 8 to facilitate mounting of the waterproofing system 1 to a substrate.

Figure 6:
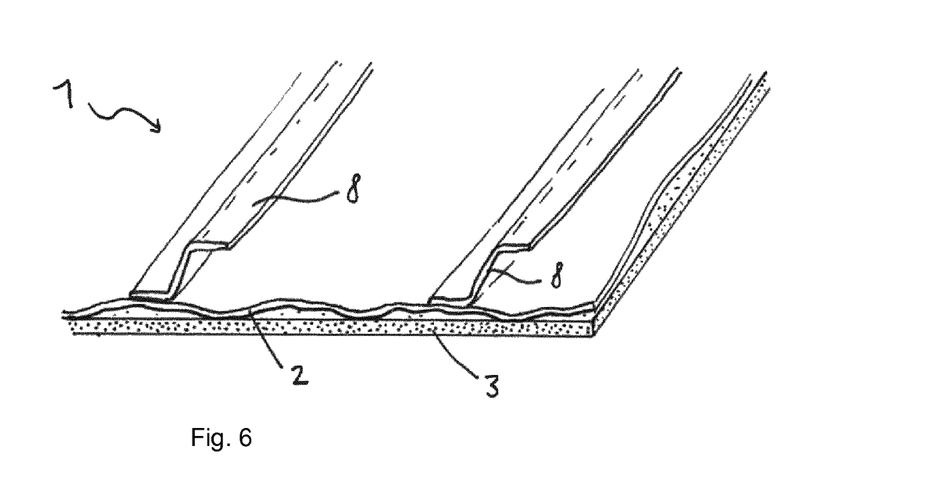
FIG. 6 shows a cross-section of a waterproofing system having a mounting layer and a functional layer, wherein the mounting layer is in the form of a fabric attached spot-wise to the functional layer and further comprising additional mounting elements in the form of fabric strips to facilitate mounting of the waterproofing system to a substrate.

FIG. 6 shows a waterproofing system 1 having a mounting layer 2 and a functional layer 3, wherein the mounting layer 2 is in the form of a fabric attached spot-wise to the functional layer 3 and further comprising additional mounting elements 8 in the form of fabric strips to facilitate mounting of the waterproofing system 1 to a substrate. The fabric strips are in such an embodiment typically welded, sewed, adhesively bonded or otherwise mechanically fixed, e.g. with rivets, to the fabric of the mounting layer.

Figure 7:
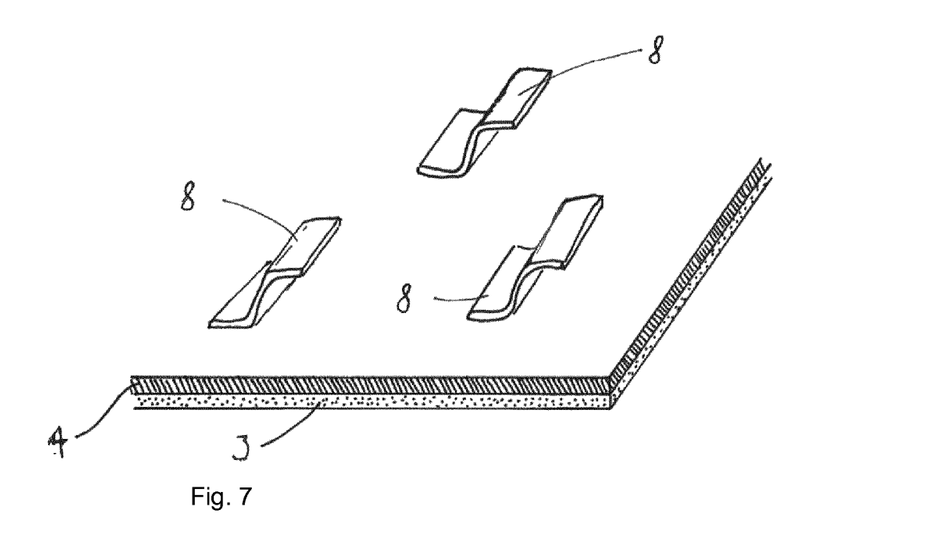
FIG. 7 shows a cross-section of a waterproofing system having a mounting layer, an optional barrier layer and a functional layer, wherein the mounting layer is in the form of a fabric applied discontinuously to the barrier layer.

FIG. 7 shows a waterproofing system 1 having a mounting layer 2, a barrier layer 4 and a functional layer 3, wherein the mounting layer is in the form of a fabric applied discontinuously to the barrier layer 4. The mounting layer 2 is thereby typically welded or adhesively bonded to the barrier layer.

Figure 8:
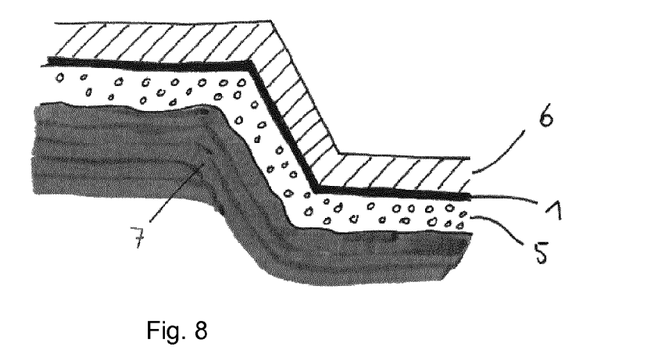
FIG. 8 shows a cross-section of a concrete construction with a blinding concrete layer on a substrate, a waterproofing system and a reinforced concrete layer.

FIG. 8 shows a cross-section of a concrete construction with a first layer of concrete 5 which is a blinding concrete layer applied on a substrate 7, a waterproofing system 1 applied on the blinding concrete layer with the mounting layer facing towards the blinding concrete layer and a second layer of concrete 6 which is a reinforced concrete layer and typically is part of any kind of construction.

Figure 9:
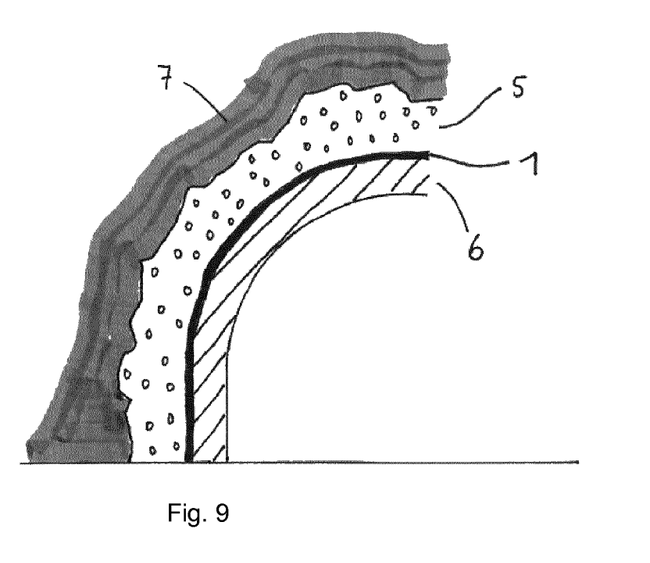
FIG. 9 shows a cross-section of a tunnel with a shotcrete concrete layer on a substrate, a waterproofing system and a reinforced concrete lining.

FIG. 9 shows a cross-section of a tunnel with a first concrete layer 5 which is a shotcrete layer applied on a substrate 7, a waterproofing system 1 applied on the shotcrete layer with the mounting layer facing towards the shotcrete layer and a second layer of concrete 6 which is a reinforced concrete layer and typically is concrete lining.

Figure 10:
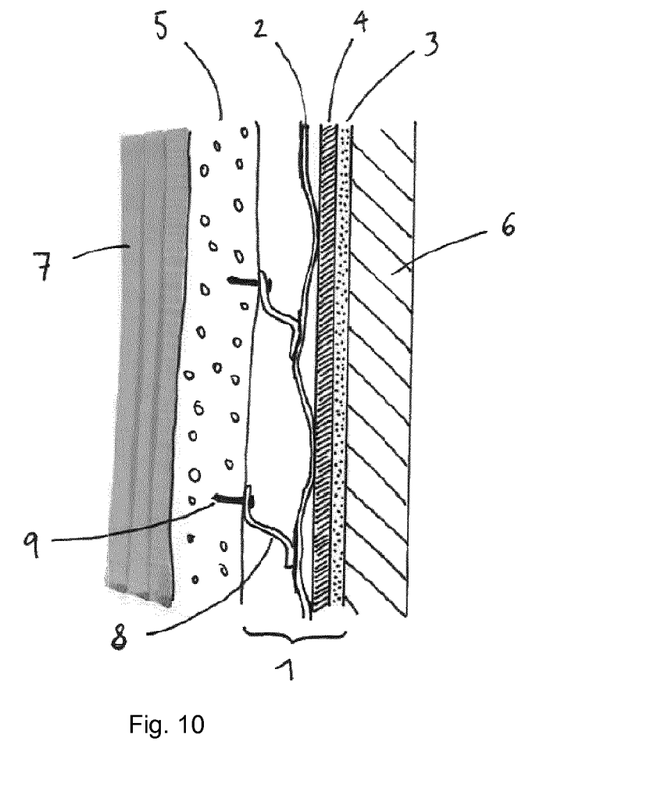
FIG. 10 shows a cross-section of a concrete construction with a blinding concrete layer on a substrate, a waterproofing system with a fabric mounting layer comprising additional mounting elements to facilitate mounting of the waterproofing system, a barrier layer, a functional layer and a reinforced concrete layer.

FIG. 10 shows a cross-section of a concrete construction with a first concrete layer 5, which typically is a blinding concrete layer or a shotcrete layer, on a substrate 7, a waterproofing system 1 with a mounting layer 2 being a fabric and comprising additional mounting elements 8 to facilitate mounting of the waterproofing system 1, a barrier layer 4 to which the fabric of the mounting layer 2 is attached spot-wise, typically spot-welded, a functional layer 3 and a reinforced concrete layer 6. The waterproofing system 1 is fixed to the first layer of concrete 5 with nails 9, typically applied with a nail-gun. Even though in reality, the gap between the waterproofing system 1 and the first layer of concrete 5 may be smaller than illustrated in FIG. 10, it is still sufficient to allow water drainage between the first layer of concrete 5 or any substrate in general and the barrier layer 4 of the waterproofing system.

Figure 11:
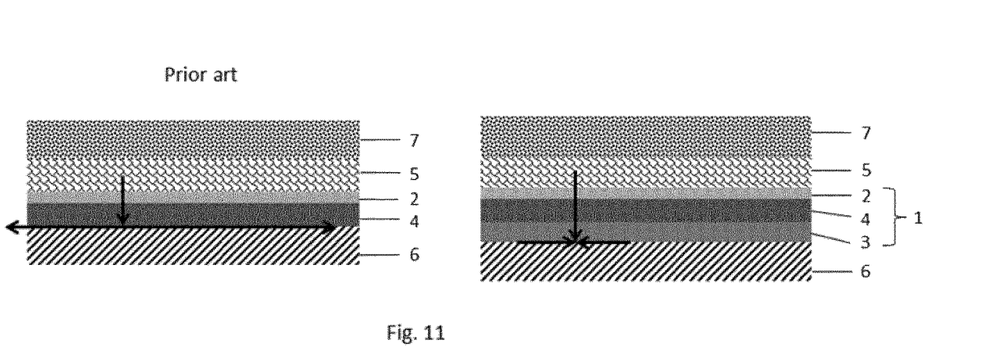
FIG. 11 shows schematic diagrams of two waterproofing systems, wherein the left one represents a State-of-the-Art waterproofing system consisting of a barrier layer (waterproofing sheet) and a fabric mounting layer, and the right one represents one waterproofing system according to one of the embodiments of the present invention comprising a barrier layer, a mounting layer, and a functional layer, which is integrally connected to the barrier layer.

FIG. 11 shows cross sections of two waterproofed concrete constructions. Left side of the figure shows a waterproofed construction comprising a first layer of concrete 5 on a surface of a substrate 7, waterproofing system according to the prior art consisting of a barrier layer 4 and a mounting layer 2, which is facing the surface of the first layer of concrete 5, such as a layer of shotcrete, and a second layer of concrete 6, wherein the barrier layer 4 is facing the surface of the second layer of concrete 6, such as a concrete lining layer. In case of a leak of water through the barrier represented by the vertical arrow, the water would spread out laterally through a gap of between the barrier lay 4 and the second layer of concrete 6. This would result in lateral migration of water as represented by the horizontal arrows and eventually in loss of waterproofing effect. The right side of the figure shows a waterproofed construction according to one of one embodiment of the present invention, the construction comprising a first layer of concrete 5, such as a layer of shotcrete, on a surface of a substrate 7, a second layer of concrete 6, such a concrete lining layer, and a waterproofing system 1 installed between the first and second layer of concrete such that the mounting layer 2 is facing the surface of the first layer of concrete 5 and the functional layer 3 is facing the surface of the second layer of concrete 6. In this case the functional layer 3 is fully bonded to the second layer of concrete 6 and, therefore, a leak of water through the barrier layer 4 represented by the vertical arrow is not able to spread laterally between the functional layer 3 and the second layer of concrete. This type of waterproofed construction is able to maintain its watertightness after water ingress as represented by the horizontal arrows directing to the point of leakage.

EXAMPLES

Preparation of the Example Membranes

The example membranes EX1 and EX2, each comprising a barrier layer and a functional layer, were produced with a laboratory scale extrusion-calendering apparatus comprising a flat die and set of water-cooled calender rolls. The layers were extruded with a twin screw extruder (Berstorff GmbH).

For each example membrane, the functional layer was first produced with the extrusion-calendering apparatus after which a barrier layer was extruded and bonded on one surface of the functional layer using the same extrusion-calendering apparatus. The barrier layer composition is based on the commercially available waterproofing membrane Sikaplan® WT 1210 HE available from Sika.

The extruder part of the apparatus was equipped with a flat die and the melted compositions of the functional layers were extruded without using a die lip. The polymer component of the functional layer was first melt-processed in the extruder at a temperature, which is approximately 30° C. above the melting temperature of the polymer component before the solid filler component was fed into the extruder through a side feeder. The produced functional layers had a thickness of approximately 1.5 mm while the thickness of the barrier layer was approximately 0.5 mm. A melted composition of the barrier layer was extruded with a flat die on the surface of each functional layer and the layers were pressed together and cooled between calender cooling rolls.

The operating conditions of the extruder-calender apparatus during production of the example membranes are presented in Table 1 and the compositions of the functional layers are presented in Table 2. The extrusion temperature and pressure were measured at a point, where the melted mass entered the flat die. The temperature of the cooling rolls was approximately 20° C. during the production period.

TABLE 1

Operating conditions of the extrusion process of functional layers/barrier layer

| Layer | EX1 | EX2 | Barrier layer |
|---|---|---|---|
| Extrusion pressure [bar] | 77 | 58 | 61 |
| Extrusion temperature [° C.] | 160 | 160 | 160 |
| Extrusion flux [kg/h] | 12 | 13 | 10 |
| Roller gap [mm] | 3 | 3 | 1.8 |
| Roller speed [m/min] | 0.47 | 0.51 | 0.78 |

Preparation of Concrete Test Specimen

Three sample membranes with a dimension of 200 mm (length)×50 mm (width) were cut from each of the example membranes EX1 and EX2 produced as described above. The sample membranes were placed into formworks having a dimension of 200 mm (length)×50 mm (width)×30 mm (height) with the functional layer facing upwards and with the barrier layer against the bottom of the formwork.

One edge of each sample membrane on the side of the contact layer was covered with an adhesive tape having a length of 50 mm and width coinciding with the width of the membrane sample to prevent the adhesion to the hardened concrete. The adhesive tapes were used to provide easier installation of the test specimens to the concrete adhesion strength testing apparatus.

For the preparation of concrete specimens a batch of fresh concrete formulation was prepared. The fresh concrete formulation was obtained by mixing 8.9900 kg of a concrete dry batch of type MC 0.45 conforming to EN 1766 standard, 0.7553 kg of water and 0.0202 kg of Sikament-12S for five minutes in a tumbling mixer. The concrete dry batch of type MC 0.45 contained 1.6811 kg of CEM I 42.5 N cement (Normo 4, Holcim), 7.3089 kg of aggregates containing 3% Nekafill-15 (from KFN) concrete additive (limestone filler), 24% sand having a particle size of 0-1 mm, 36% sand having a particle size of 1-4 mm, and 37% gravel having a particle size of 4-8 mm. Before blending with water and Sikament-12S the concrete dry batch was homogenized for five minutes in a tumbling mixer.

The formworks containing the sample membranes were subsequently filled with the fresh concrete formulation and vibrated for two minutes to release the entrapped air. After hardening for one day the test concrete specimens were stripped from the formworks and stored under standard atmosphere (air temperature 23° C., relative air humidity 50%) before measuring the concrete adhesion strength.

Measurement of Concrete Adhesion Strength

The measurement of concrete adhesion strength of sample membranes from hardened concrete specimen was conducted in accordance with the procedure laid out in the standard DIN EN 1372:2015-06 with a Zwick Roell AllroundLine Z010 material testing apparatus equipped with a Zwick Roell 90°-peeling device (type number 316237).

For the concrete adhesion strength measurements, a concrete specimen was clamped with the upper grip of the material testing apparatus for a length of 10 mm at the end of the concrete specimen comprising the taped section of the sample membrane. Following, the sample membrane was peeled off from the surface of the concrete specimen at a peeling angle of 90° and at a constant cross beam speed of 100 mm/min. During the measurements the distance of the rolls was approximately 570 mm. The peeling of the sample membrane was continued until a length of approximately 140 mm of the sample membrane was peeled off from the surface of the concrete specimen. The values for concrete adhesion strength were calculated as average peel force per width of the sample membrane [N/50 mm] during peeling over a length of approximately 70 mm thus excluding the first and last quarter of the total peeling length from the calculation.

The average concrete adhesion strength values for the example membranes presented in Table 2 have been calculated as an average of measured values obtained with three sample membranes cut from the same example membrane.

TABLE 2

Compositions of the contact layers and measured concrete adhesion strength

| Functional layer | EX1 [wt.-%] | EX2 [wt.-%] |
|---|---|---|
| Elvax 260 A (EVA copolymer with 28 wt.-% vinyl acetate available from DuPont) | 10.5 | |
| Levapren 700 (EVA copolymer with 70 wt.-% vinyl acetate available from Lanxess) | 39.5 | |
| Levapren 900 (EVA copolymer with 90 wt.-% vinyl acetate available from Lanxess) | | 25 |
| Vistamaxx 6202 (PP-PE copolymer with 15 wt.-% polyethylene available from ExxonMobile | | 25 |
| Holcim optimo 4 (CEM II/B-M (T-LL) 42,5 N SN EN 197-1 cement available from LaFargeHolcim) | 50 | 50 |
| Concrete adhesion strength after 1 day [N/50 mm] | 54.7 | 36.1 |
| Concrete adhesion strength after 7 days [N/50 mm] | 82.7 | 54.4 |
| Concrete adhesion strength after 28 days [N/50 mm] | 92.4 | 98.2 |

The invention claimed is:

1. A waterproofing system comprising:
   at least two different layers, one layer being a mounting layer and one other layer being a functional layer, the two layers being directly or indirectly connected to each other over at least parts of their opposing surface; and a barrier layer located between the mounting layer and the functional layer, the barrier layer and the mounting layer being connected to each other over at least parts of their opposing surfaces, and the functional layer being integrally connected to the barrier layer over its entire surface, wherein the functional layer comprises at least a thermoplastic polymer P1, the thermoplastic polymer P1 being present in an amount in a range of 20 to 85 wt % based on a total weight of the functional layer, the mounting layer comprises at least one of an adhesive and a fabric, and the barrier layer has a thickness in a range of 0.5 to 5 mm.

2. The waterproofing system according to claim 1, wherein the fabric is a nonwoven fabric.

3. The waterproofing system according to claim 1, wherein the barrier layer comprises at least a thermoplastic polymer P2.

4. The waterproofing system according to claim 1, wherein the thermoplastic polymers P1 is selected from the group consisting of ethylene-vinyl acetate copolymers (EVA), ethylene-acrylic ester copolymers, ethylene-α-olefin co-polymers, ethylene-propylene co-polymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), polyisobutylene (PIB) and mixtures thereof.

5. The waterproofing system according to claim 3, wherein the thermoplastic polymer P2 is joined to the thermoplastic polymer P1.

6. The waterproofing system according to claim 1, wherein the functional layer further comprises a mineral binder comprising at least one component selected from the group consisting of a hydraulic binder, a non-hydraulic binder, a latent hydraulic binder, a puzzolanic binder and mixtures thereof.

7. The waterproofing system according to claim 1, wherein the functional layer further comprises a surfactant.

8. A method for producing a building structure sealed against water penetration comprising the steps of:

applying a first layer of concrete onto a surface of a substrate;

installing a waterproofing system according to claim 1, onto the surface of the first layer of concrete in a way that the mounting layer of the waterproofing system is facing the surface of the first layer of concrete and is at least partially connected to the surface of the first layer of concrete;

applying a second layer of concrete onto the waterproofing system in a way that the functional layer of the waterproofing system is facing the surface of the second layer of concrete and at least partially connected to the surface of the second layer of concrete.

9. The method according to claim 8, wherein the first layer of concrete is a blinding concrete layer or a shotcrete layer.

10. The method according to claim 8, wherein the second layer of concrete is a reinforced concrete layer.

11. A waterproofed construction comprising at least one layer of concrete and a waterproofing system according to claim 1, wherein either the mounting layer or the functional layer is connected to the layer of concrete.

12. The waterproofed construction according to claim 11, wherein the at least one layer of concrete is a reinforced concrete layer and wherein the functional layer of the waterproofing system is integrally connected to the reinforced concrete layer over its entire surface.

13. The waterproofed construction according to claim 12, wherein the construction further comprises a blinding concrete layer or a shotcrete layer located adjacent to the waterproofing system and wherein the mounting layer of the waterproofing system is at least partially connected to the blinding concrete layer or the shotcrete layer.

14. The waterproofed construction according to claim 11, wherein the waterproofed structure is a tunnel.

15. The waterproofing system according to claim 1, wherein the thermoplastic polymer P1 is present in an amount in a range of 35 to 75 wt % based on a total weight of the functional layer.

16. The waterproofing system according to claim 1, wherein the mounting layer and the functional layer are provided as a pre-formed membrane composite.

17. The waterproofing system according to claim 1, wherein the barrier layer has water resistance at least at 0.6 bar for 24 hours measured according to EN 1928 B.

18. The waterproofing system according to claim 6, wherein the mineral binder is a substance that in the presence of water reacts in a hydration reaction under formation of solid hydrates or hydrate phases.

* * * * *